Nov. 19, 1929.    F. E. KONCANA ET AL    1,736,604
REEL
Filed Jan. 19, 1927
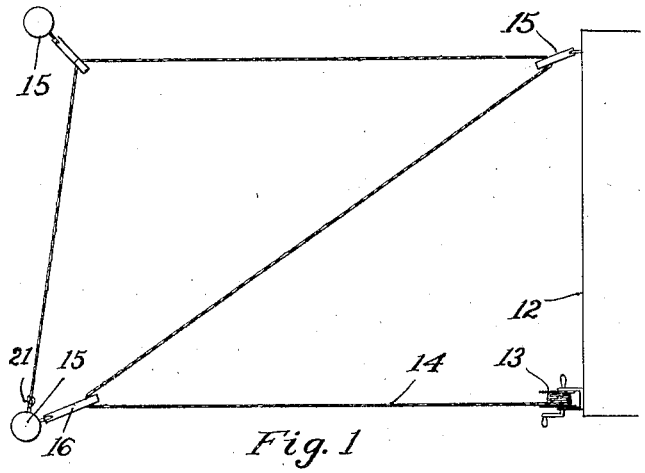
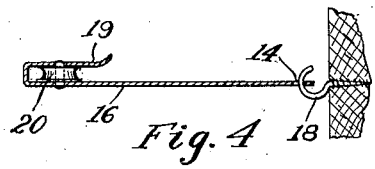
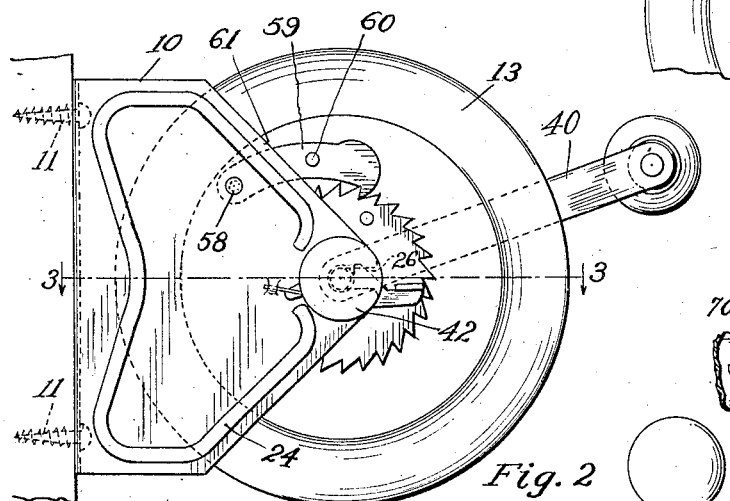
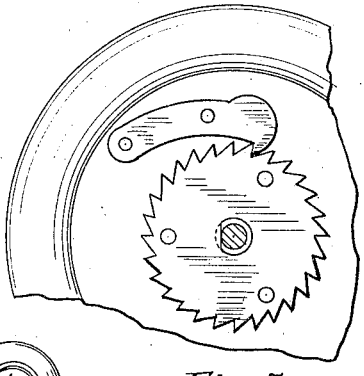
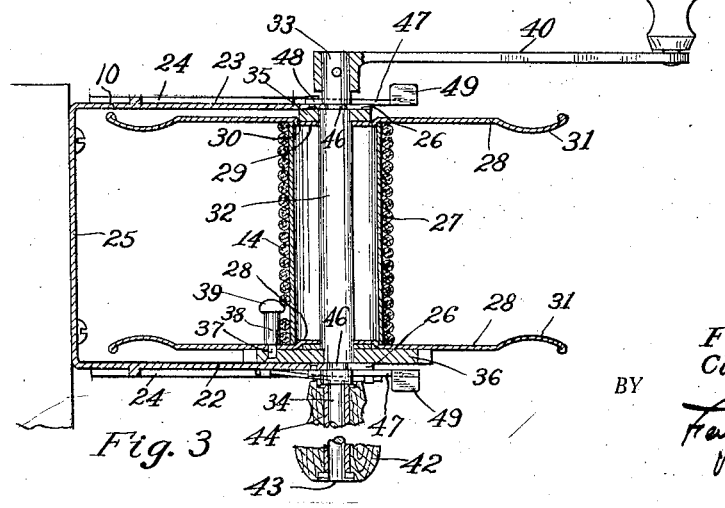
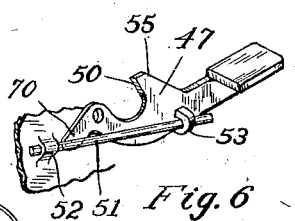
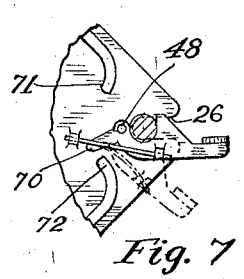
INVENTORS
Frank E. Koncana
Clarence H. Schaefer
BY
ATTORNEYS Patented Nov. 19, 1929

1,736,604

UNITED STATES PATENT OFFICE

FRANK E. KONCANA AND CLARENCE H. SCHAEFER, OF CLEVELAND, OHIO

REEL

Application filed January 19, 1927. Serial No. 162,147.

This invention, relating as indicated to reels, is more particularly directed to an improvement in clothesline reels, and among the objects of the invention we have sought to provide a simplified type of reel which is inexpensive in construction and expeditious in operation.

An object of the invention is to provide in connection with our novel clothesline reel an improved mounting therefor in which the reel may be easily and readily detached. We find that our construction is of considerable advantage in the erecting of the clothesline and that by providing several of the mountings for the one reel a single line may be utilized in various places, or as might be desired in apartment houses one mounting may be used to accommodate the reels of several users. Further, the present reel may be removed from its mounting when the same is on the outside of a house and kept in a dry place when not in use.

A further object of the invention is to so construct the removable reel that it may be used as a hand reeling device when taking down or putting up a line. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Fig. 1 is a diagrammatical view illustrating a preferred embodiment of our invention in use; Fig. 2 is an enlarged side elevation of the reel and mounting; Fig. 3 is a cross-sectional view taken on the line 3—3 of Fig. 2; Fig. 4 is a sectional view through one of the hook line guides; and Figs. 5, 6 and 7 detail views illustrating several of the improvements in construction of the present novel reel.

The embodiment of the invention illustrated in the aforesaid drawing consists of a bracket head adapted to be secured in any suitable manner, such as by screws 11 to the side of a house 12. Removably carried in such bracket is a reel 13, upon which is wound the clothesline 14. As seen in Fig. 1 this line may be strung between various points 15 and guided in removable hook members 16. These latter members are constructed of sheet metal, providing at one end an aperture 17 by which the same may be detachably hooked upon a screw 18 and at the other end with a rebent portion 19 in which is a rotatable pulley 20.

In the use of the present clothesline reel the end 21 of the line may be first attached in the proper position and the reel 13, having been removed from its support, transported to the various positions 15 and then placed in the support 10, or the line may be drawn from the reel when in position in said support.

Referring now to Figs. 2 and 3 the supporting member 10 is shown as being formed of sheet metal bent into U-shape and having the sides 22 and 23 thereof provided with raised ribs 24, which serve to strengthen such member. The connecting portion 25 of the support is suitably apertured for the reception of mounting screws 11. The outer ends of sides 22 and 23 are bifurcated to provide outwardly opening slots or recesses 26.

The reel 13 is also constructed of assembled sheet metal parts consisting of a tubular spacer 27, upon which the line 14 is wound, and side members 28, said latter members being struck inwardly at 29 to provide annular shoulders 30 which properly position the tube 27. The outer circumference of sides 28 is formed with ribs 31 which serve to strengthen such sides. Extending centrally through the sleeve 27 and sides 28 is a shaft 32 having its ends 33 and 34 projecting beyond the sides 28 and having secured to such projecting ends suitable locking members 35 and 36, which hold the reel in assembled position. The member 35 in the drawings consists of a washer fixed to the shaft 32 and the member 36 consists of a ratchet wheel which is riveted to the adjacent side at 37 by a rivet 38. The ratchet wheel 36 will be described more particularly hereinafter. The rivet 38 is provided with an inwardly projecting extension and has its extremity 39 formed with an enlarged button. As seen from Fig. 3 the rivet 38 is projected closely parallel to the tube 27, providing just sufficient space for the size of the line 14 therebetween, and this construction is utilized to expeditiously secure such line to the reel proper. In use, the end of the line is fed between the tube 27 and rivet 38 and a knot tied therein which holds the same from being pulled between said two members.

The end 33 of shaft 32 has secured thereto a handle or crank 40, by which the reel may be rotated. The other end 34 of the shaft is slightly reduced and a second handle 42 rotatably mounted thereon, the end of the shaft being spun over as at 43 to retain such handle in place while permitting the rotation thereto. A sleeve or button 44 may be provided on the end 34 of the shaft.

As stated hereinbefore the bracket 10 is of U-shape and has the outer ends of sides 22 and 23 provided with outwardly opening slots 26, in which is receivable the ends of the shaft 32 of the reel. The reel proper fits within the sides 22 and 23 when in assembled relation. In each end of the shaft 32 is formed a reduced portion 46 which fits the slots 26 serving to locate the reel in proper position in the bracket 10. Mounted on each of the sides of said bracket are latch members 47 pivoted upon pins 48 riveted to the sides 23 and 24 and having their outer ends formed with laterally bent pads 49. The outer surface of the latches is formed with a recess 50, which fits around the shaft 32 when said latch is in raised position and prevents lateral movement of the shaft. A spring 51 is engaged with the latch 47 to normally keep the same pressed upwardly to engage the shaft 32. The rear end of springs 51 are rigidly held in projections 52 struck up from the sides of bracket member 10. The other end of the spring is received in a projection or lip 53 formed integrally with the latch member 47. The latch members 47 are provided along their upper edge with an inclined or beveled surface 55, the purpose of which will be presently described. As seen in Fig. 7 the latches 47 may be provided with rearward extensions 70, which are adapted to engage with ribs struck out from the sides 24 and 25 to limit the movement of such latches.

In operation if it is desired to remove the reel from the support the operator depresses each of the latch members 47 by placing a finger on the pads 49 and the reel is slipped outwardly from the slots 26. In replacing the reel in the bracket the former is merely pressed inwardly toward the bracket, the ends of the shaft 32 engaging with the beveled surface 55 to depress the latch members 47 and permit the proper seating of the recessed portions 46 in the slots 26 of the bracket 10. In performing either of the above noted operations the reel may be handled by the operator with the aid of the knob 42 and handle 40.

On the side of the bracket 10 adjacent the ratchet wheel 36 of the reel is pivotally mounted, about a pin 58, a pawl 59 having its outer end falling into the peripheral plane of said wheel. Obviously this pawl prevents rotation of the reel in one direction and serves to hold the line 14 taut. In the side of the pawl is secured a projecting pin 60 by which the same may be engaged by the operator to raise the pawl out of engagement with the ratchet wheel to permit the reel to be turned in the opposite direction. This pin 60 also serves to limit the downward movement of the pawl when the reel 13 is removed from the bracket 10. From an inspection of Fig. 2 it will be seen that the pin 60 will engage with the inclined surface 61 of the side 24 to perform the last stated function. Such pin also serves to limit the movement of the pawl in the opposite direction, as when the reel may be turned upside down, which is the case when the line is being strung in position by first attaching the end 21 and then drawing away on the reel 13.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a device of the character described, the combination of a U-shaped bracket, a reel detachably carried thereby, spring pressed means for releasing said reel, said means being pivoted to the sides of said bracket and having finger pads for manual operation whereby the same may be engaged by the hand simultaneous with the removal of the reel.

2. In a device of the character described, the combination of a U-shaped bracket, a reel detachably carried thereby, a ratchet secured to said reel, a pawl pivoted to said bracket adapted to engage said ratchet to prevent rotation of said reel in one direction, and a pin carried by said pawl whereby the same may be manually disengaged from said ratchet, said pin also being adapted to engage the side of said bracket to hold the pawl in substantial operating position upon the detachment of said reel.

3. In a device of the character described, the combination of a U-shaped bracket having open-ended slots in the forward ends of its sides, pivoted latches mounted on said sides adapted to close the open ends of said slots, springs acting on said latches to maintain the same to normally close said slots, a reel, and a shaft carried thereby and having its ends projected beyond the sides of the reel, said shaft ends being receivable in said bracket slots.

4. In a device of the character described, the combination of a U-shaped bracket having open-ended slots in the forward ends of its sides, pivoted latches mounted on said sides adapted to close the open end of said slots, inclined surfaces on said latches spring for normally positioning said latches in closed relation to said slots, and a reel provided with an operating shaft having its ends projecting beyond the sides of said reel, said ends being receivable in said slots to mount the reel in said bracket, and said ends being adapted to engage said inclined surfaces to depress said latches when assembling the reel in the bracket.

5. A reel comprising a central tubular spacer, sides seating against the ends of said tube, a shaft extending through said tube, means fixed to said shaft outside said sides for holding the same in assembled relation, a ratchet wheel secured to said shaft adjacent one of said sides, a rivet locking the wheel to said side, and an inward projection on said rivet extending closely parallel to the tubular spacer between which two latter members the end of a line may be secured to the reel.

6. In a device of the character described, the combination of a U-shaped bracket having open-ended slots in the forward end of its sides, a reel detachably carried thereby, means for holding said reel against rotation in one direction, manually operated means for releasing said first means, a shaft carried by said reel and receivable in said slots, pivoted latches mounted on the sides of the bracket for engaging the ends of said shaft and projecting finger pads on said latches whereby the same may be actuated to permit removal of said reel.

Signed by us, this 20th day of December, 1926.

FRANK E. KONCANA.
CLARENCE H. SCHAEFER.